US008855493B2

(12) United States Patent
Elhage

(10) Patent No.: US 8,855,493 B2
(45) Date of Patent: Oct. 7, 2014

(54) ONU EMULATOR DEPLOYMENT FOR MIXED TYPES OF ONU TRAFFIC

(71) Applicant: Hassan Elhage, San Jose, CA (US)

(72) Inventor: Hassan Elhage, San Jose, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 258 days.

(21) Appl. No.: 13/645,949

(22) Filed: Oct. 5, 2012

(65) Prior Publication Data

US 2014/0099100 A1    Apr. 10, 2014

(51) Int. Cl.
*H04B 10/00* (2013.01)

(52) U.S. Cl.
USPC .................................. 398/72; 398/17; 398/25

(58) Field of Classification Search
USPC .......................................... 398/66–73, 17, 25
See application file for complete search history.

(56) References Cited

U.S. PATENT DOCUMENTS

| | | | | |
|---|---|---|---|---|
| 8,805,183 | B2* | 8/2014 | Dvir ................................ | 398/10 |
| 2004/0109450 | A1* | 6/2004 | Kang et al. ..................... | 370/390 |
| 2008/0069564 | A1* | 3/2008 | Bernard .......................... | 398/72 |
| 2008/0267630 | A1* | 10/2008 | Qian et al. ...................... | 398/89 |
| 2009/0324228 | A1* | 12/2009 | Bernard et al. ................. | 398/79 |
| 2011/0072119 | A1* | 3/2011 | Bronstein et al. .............. | 709/222 |
| 2012/0257894 | A1* | 10/2012 | Sarashina et al. ............... | 398/58 |
| 2013/0089318 | A1* | 4/2013 | Mahony et al. ................. | 398/2 |
| 2013/0202300 | A1* | 8/2013 | Dvir et al. ....................... | 398/58 |
| 2014/0099100 | A1* | 4/2014 | Elhage ............................ | 398/25 |
| 2014/0099101 | A1* | 4/2014 | Elhage ............................ | 398/25 |
| 2014/0178076 | A1* | 6/2014 | Fang et al. ...................... | 398/98 |

OTHER PUBLICATIONS

"Gigabit-capable passive optical networks (GPON): General characteristics", *ITU-T, Telecommunicaiton Standardization Sector of ITU*, G.984.1, Mar. 2008, 32 pages.

* cited by examiner

*Primary Examiner* — Agustin Bello
(74) *Attorney, Agent, or Firm* — Blakely, Sokoloff, Taylor & Zafman, LLP

(57) ABSTRACT

An Optical Network Unit (ONU) emulator enables traffic emulation in a Gigabit-capable Passive Optical Network (GPON) that couples an Optical Line Termination (OLT) system to the ONU emulator and carries mixed types of emulated ONU traffic and real ONU traffic. The ONU emulator includes one or more emulated ONU platforms; each emulated ONU platform includes multiple ONU emulator blocks, and each ONU emulator block includes circuitry to emulate multiple emulated ONUs simultaneously. An emulated ONU platform generates upstream GPON frames according to respective profiles of the emulated ONUs, and sends the upstream GPON frames to the OLT system. At least a subset of the upstream GPON frames reach the OLT system via one or more passive optical splitters that couple the emulated ONU platform and a set of real ONUs to the OLT system. The emulated ONU platform also receives downstream GPON frames from the OLT system.

26 Claims, 7 Drawing Sheets

ONU EMULATOR DEPLOYMENT FOR MIXED TYPES OF ONU TRAFFIC

TECHNICAL FIELD

Embodiments of the invention relate to network simulation; and more specifically, to an optical network unit (ONU) emulator in a Gigabit-capable Passive Optical Network (GPON).

BACKGROUND

A passive optical network (PON) consists of one or more optical line termination (OLT) systems (also referred to as OLTs), a number of optical network units (ONUs), and an optical distribution network (ODN) including fibers and splitters between the OLTs and the ONUs. Each OLT is a service provider node, and each ONU is a subscriber node. A PON is a widely-adopted architecture for economically delivering telecommunications services to individual subscribers or groups of subscribers. One common type of PON deployment is based on ITU-T G.984 (Gigabit-capable PON (GPON)).

In a GPON system, there is in general a one-to-many relationship between an OLT system and the ONUs. An example of an ONU is a Single Family Unit (SFU), which typically serves one house or apartment, or a Multi-Dueling Unit (MDU), which typically serves multiple houses or apartments.

Many GPON venders provide an OLT system and a portfolio of ONUs to address different market needs. Some ONU types are designed to provide both voice services (based on plain-old telephone service (POTS)) and data services; whereas other ONU types are designed to provide data services only, such as high speed internet access (HSIA), video and/or session initiation protocol (SIP) based services. Some ONU types are designed to include residential gateway capabilities; whereas other ONU types rely on an external third-party residential gateway. A typical leading GPON vendor may offer over twenty versions of ONU types to be supported by the same OLT system.

A typical OLT system when fully loaded may support up to tens of thousands of ONUs (e.g., 14×16×64=14,336 ONUs). To ensure that a fully loaded GPON OLT system meets the scalability, availability, reliability, performance and service quality requirements for different GPON markets where different ONU types are deployed, an equipment vendor often needs to test various traffic usage patterns and load conditions that are generated to/from the large number of ONUs. Using real field deployable ONUs in the lab (e.g., 14,336 ONUs) to test a fully loaded GPON OLT system becomes prohibitive with respect to the lab space, number of racks to stack the thousands of ONUs, number of cables, number of switches, human efforts to manage and operate the ONUs, and very high energy consumption.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

SUMMARY

Figure 1:
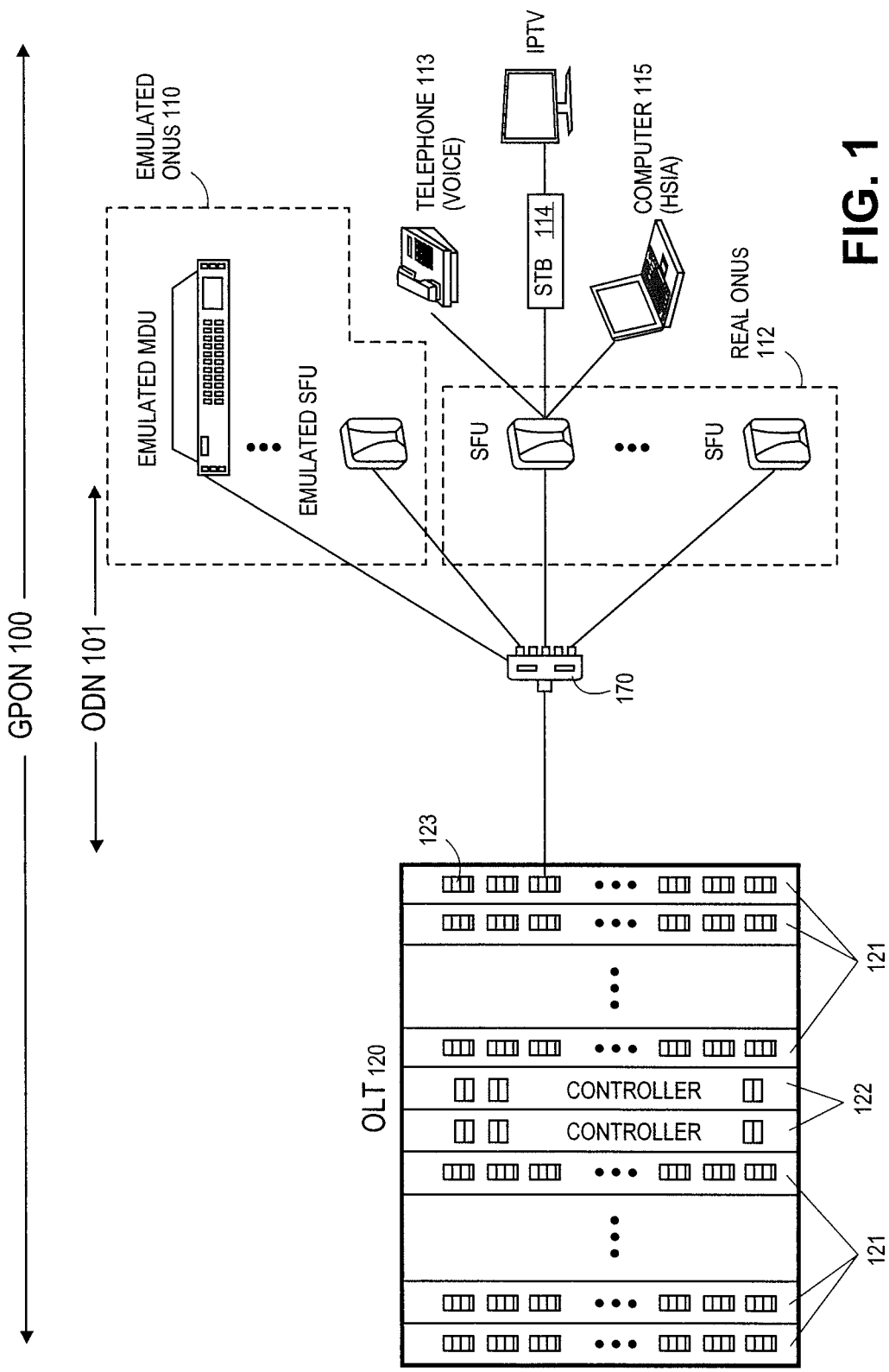
FIG. 1 illustrates an example of a GPON emulation system according to one embodiment of the invention.

An Optical Network Unit (ONU) emulator enables traffic emulation in a Gigabit-capable Passive Optical Network (GPON) that couples an Optical Line Termination (OLT) system to the ONU emulator and carries mixed types of emulated ONU traffic and real ONU traffic. The ONU emulator includes one or more emulated ONU platforms; each emulated ONU platform includes multiple ONU emulator blocks, and each ONU emulator block includes circuitry to emulate multiple emulated ONUs simultaneously. In one embodiment, a method performed by an emulated ONU platform comprising: generating GPON frames according to respective profiles of the emulated ONUs, and sending the GPON frames to the OLT system. At least a subset of the GPON frames reach the OLT system via one or more passive optical splitters that couple the emulated ONU platform and a set of real ONUs to the OLT system. The emulated ONU platform also receives downstream traffic form the OLT system.

In another embodiment, an emulated ONU platform is provided for executing functions of a plurality of emulated ONUs simultaneously. The emulated ONU platform comprises a plurality of ONU emulator blocks; memory within each of the ONU emulator blocks to store profiles of the plurality of emulated ONUs, and traffic generation hardware within each of the ONU emulator blocks to emulate multiple ones of the emulated ONUs simultaneously. The traffic generation hardware is adapted to generate GPON frames according to respective profiles of the multiple emulated ONUs. The emulated ONU platform also comprises a plurality of GPON ports, each of which is adapted to send the GPON frames to the OLT system and to receive downstream traffic from the OLT system. At least a subset of the GPON frames reach the OLT system via the one or more passive optical splitters that couple the emulated ONU platform and the real ONUs to the OLT system.

In yet another embodiment, a system is provided for traffic emulation in a GPON that carries mixed types of emulated ONU traffic and real ONU traffic. The traffic emulation can be used to assess an effect of the traffic load imposed by an ONU emulator on an OLT system and on real ONUs. The OLT system includes a plurality of OLT packs, and each of the OLT packs includes a plurality of OLT ports. The system comprises one or more passive optical splitters that couple the ONU emulator and the real ONUs to the OLT system, and the ONU emulator that is coupled to the OLT ports via GPON links and the passive optical splitters to execute functions of a plurality of emulated ONUs simultaneously. The ONU emulator further comprises memory to store profiles of the plurality of emulated ONUs, one or more ONU emulator platforms, each of which includes a plurality of ONU emulator blocks, traffic generation hardware within each of the ONU emulator blocks to emulate multiple emulated ONUs simultaneously. The traffic generation hardware is adapted to generate GPON frames according to respective profiles of the multiple emulated ONUs. The emulated ONU platform also comprises a plurality of GPON ports, each of which is adapted to send the GPON frames to the OLT system and to receive downstream traffic from the OLT system. At least a subset of the GPON frames reach the OLT system via the one or more passive optical splitters that couple the emulated ONU platform and the real ONUs to the OLT system.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a GPON ONU emulator that optimizes the testing of an OLT system (also referred to as an "OLT") in cost effective, flexible and user friendly ways. The ONU emulator allows end-users to test real-world scenarios using various traffic patterns and load conditions. Embodiments of the invention also provide a GPON ONU emulation test environment setup that can be used for testing a fully loaded GPON OLT system in the lab.

The ONU emulator described herein is capable of emulating a large number of GPON ONUs of various types concurrently. Thus, the ONU emulator can be used for testing the scalability, capacity, reliability, performance and functionality of a fully-loaded OLT. The ONU emulator provides tools and mechanisms for generating various traffic load conditions to allow simulation of various real-world scenarios and traffic patterns. Through the simulations, an end user can easily test various "what-if" scenarios and verify the impact of certain load conditions and traffic patterns on the OLT's behavior and functions.

Embodiments of the invention also allow the OLT performance to be tested under a variety of test conditions, including a combination of real network traffic and emulated network traffic. The OLT can be tested under a controlled level of load, and the effect of the emulated network traffic on the OLT and on the real ONUs can be observed and analyzed. For example, the OLT's dynamic bandwidth allocation function and bandwidth limitation can be tested under various emulated network traffic load, and the effect of the various emulated network traffic load on the real ONUs can be analyzed.

FIG. 1 illustrates an example of a GPON emulation system 100 that includes an OLT 120 coupled to multiple real ONUs 112 and emulated ONUs 110 via an Optical Distribution Network (ODN) 101 that includes one or more passive optical splitters 170. The real ONUs 112 are the ONUs installed on a customer's premise, such as a Single Family Unit (SFU) (which usually serves one house/apartment), or a Multi-Dwelling Unit (MDU) (which usually serves multiple houses/apartments). The term "real ONU" is used to indicate a field-deployable ONU that functions as customer-premise equipment such as telephone 113 (for voice communication), set-top box 114 (e.g., for IPTV) and computers 115 (for high-speed Internet access (HSIA)). On the other hand, an emulated ONU 110 emulates the functions of a real ONU, such that the emulated ONU 110 interacts with the OLT 120 in the same way as a real ONU. However, an emulated ONU 110 is not field-deployable but instead it operates according to profiles that are configurable to characterize the emulated ONU 110 as any one of ONU types, including SFUs and MDUs, with different types of ports and interfaces, different number of ports per port type, and the like. The different types of ports and interfaces may include but are not limited to, Gigabit Ethernet (GbE) ports, Fast Ethernet ports, plain-old telephone system (POTS) ports, E1/T1 ports, universal serial bus (USB) ports, very-high-bit-rate digital subscriber line (VDSL) ports, and the like. Also, each emulated ONU 110 can emulate an ONU type, such as SFU or MDU with some variations of supported features. For example, some of the emulated ONUs 110 may have support for wireless interfaces (e.g., Wi-Fi), radio frequency (RF) videos, and/or residential gateway capabilities, while some of the emulated ONUs 110 may not have one or more of these supports. The different ONU types being emulated can also include some variation in supported features; for example, some features may be supported by newer versions of a given ONU type only, and some advanced features may be supported by a given ONU type but not supported in other ONU types. Different emulated ONUs 110 can emulate different types of ONUs such that the operation and performance of the GPON system 100 can be evaluated under a controlled load condition.

By way of example but not limitation, the OLT 120 shown in FIG. 1 includes multiple OLT packs 121 and controller packs 122 arranged in a chassis. Each OLT pack 121 includes multiple OLT ports 123 for connecting to the real and emulated ONUs 110 and 112. In one embodiment, the OLT 120 may include two controller packs 122 and fourteen OLT packs 121. Each OLT pack 121 may include sixteen OLT ports 123, and each OLT port 123 may connect to sixty-four ONUs (including real and emulated ONUs). In different embodiments, an OLT may have different numbers of OLT packs and OLT ports, and each OLT port may be connected to a different number of real and emulated ONUs.

Figure 2:
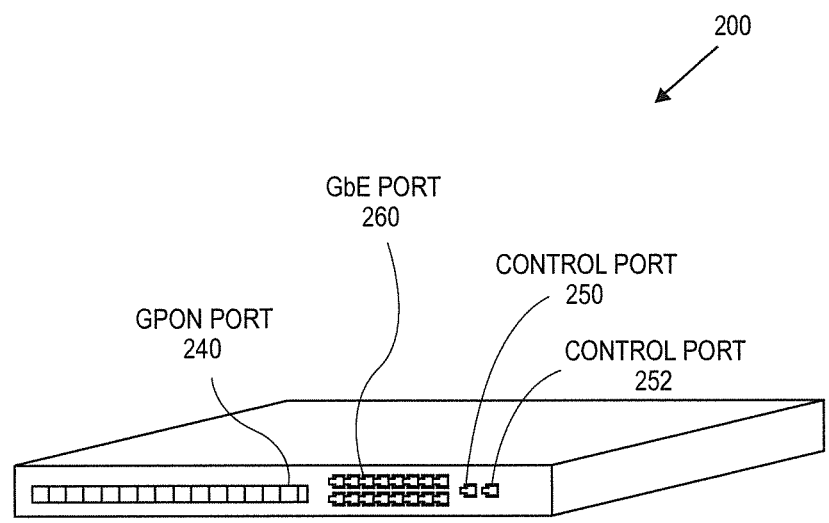
FIG. 2 illustrates an example of an emulated ONU platform according to one embodiment of the invention.

FIG. 2 illustrates an example of an emulated ONU platform 200, which can be configured as a collection of mixed types of emulated ONUs, such as any of the emulated ONUs 110 shown in FIG. 1. The emulated ONU platform 200 includes multiple GPON ports 240 for connecting to an OLT (e.g., the OLT 120 of FIG. 1), and multiple control ports 250 and 252 for connecting to external control entities, such as a central management system and a command line interface (CLI), for receiving commands and configuration inputs and outputting data logs and other information. In one embodiment, the emulated ONU platform 200 also includes multiple Gigabit Ethernet (GbE) ports 260 for connecting to an external traffic generator or analyzer. In one embodiment, the emulated ONU platform 200 includes eight GPON ports 240, sixteen gigabit ports 260 and two control ports 250; different embodiments may have different numbers of these ports.

Figure 3A:
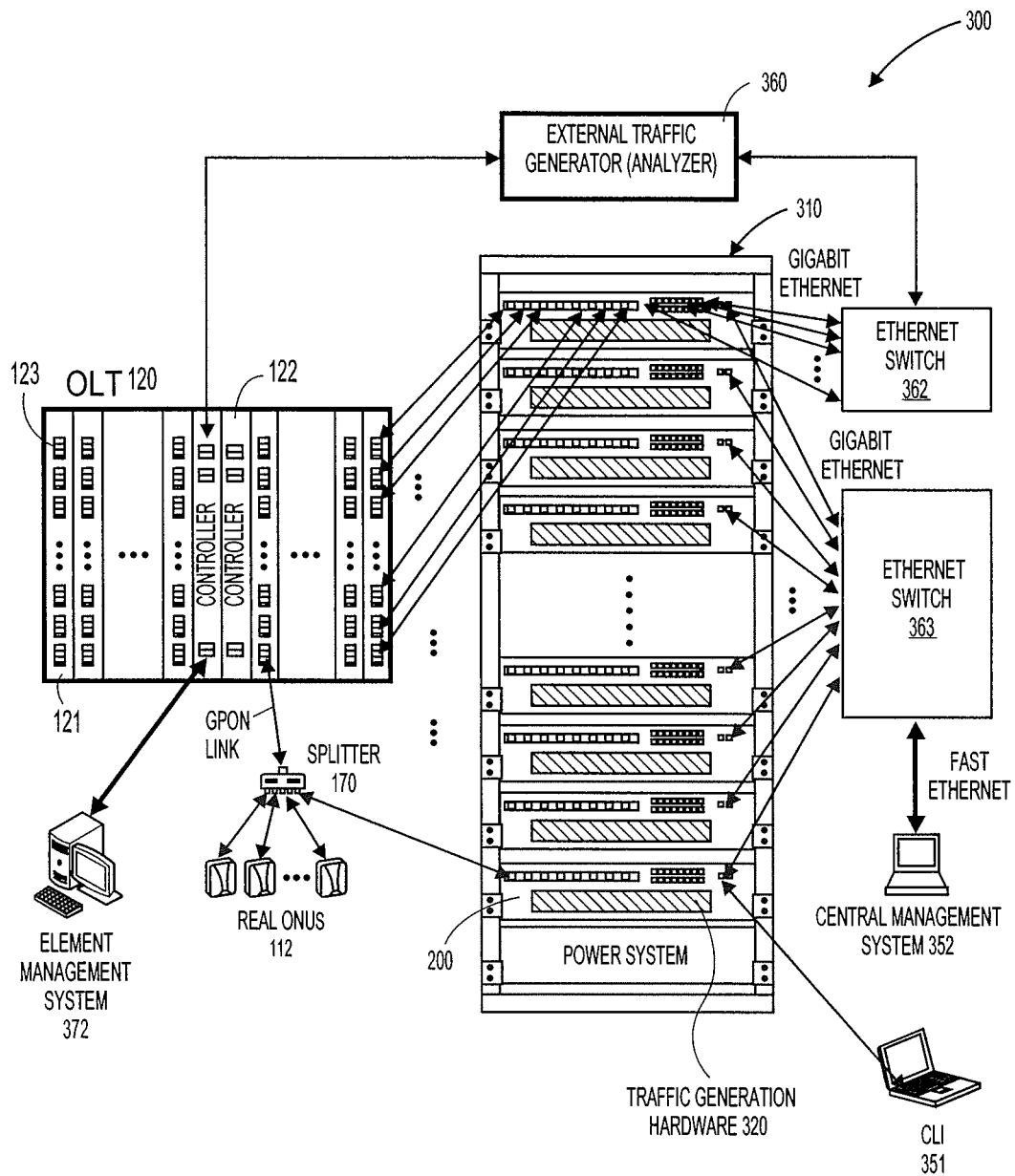
FIG. 3A illustrates further details of a GPON emulation system according to one embodiment of the invention.

FIG. 3A illustrates an example of a GPON emulation system 300 in which an ONU emulator 310 is deployed according to one embodiment. In the embodiment of FIG. 3A, the ONU emulator 310 includes multiple emulated ONU platforms 200, which can be stacked up one on top of another in a rack. Alternatively, the emulated ONU platforms 200 can be distributed across multiple locations or arranged in other kinds of physical frames or containers. Each of the emulated ONU platforms 200 includes traffic generation hardware 320 for generating emulated ONU traffic.

In this example and referred also to FIG. 2, the ONU emulator 310 is coupled to the OLT 120 via GPON ports 240, where each GPON port 240 can be connected to one of the OLT ports 123 via GPON links. The ONU emulator 310 is also coupled to an external traffic generator 360 via GbE ports 260. In one embodiment, the GbE ports 260 are connected to an external Ethernet switch module 362 via a GbE link. In one embodiment, the external traffic generator 360 can generate background network traffic as well as analyze the data exchanges between the OLT 120 and the ONU emulator 310. For example, the external traffic generator 360 can analyze the ONU upstream traffic received by the OLT 120, and the OLT downstream traffic received by the ONU emulator 310. It is understood that these connections are shown by way of example but not limitation; in alternative embodiments more or fewer connections may be established.

In one embodiment, the ONU emulator 310 can be connected to an external Ethernet switch module 363 via a GbE link. Through the external Ethernet switch module 363 and a fast Ethernet link, the ONU emulator 310 can communicate with a command line interface (CLI) 351 and a central management system 352. The CLI 351 manages the ONU emulator 110 such as start, shutdown, and reboot of ONU emulation. The CLI 351 also allows a user (e.g., a test engineer) to view the emulated ONU logs and status (e.g. the number of emulated ONUs, ONU types, operational status and the like) and to manage operations of the ONUs (e.g., create an ONU simulation profile, trigger actions on emulated ONUs and the like). The central management system 352 manages all of the ONU emulator instances. This management function can be performed through CLI-based automation scripts or a user-friendly graphical user interface (GUI).

The OLT 120 shown in FIG. 3A includes multiple OLT ports 123 in multiple OLT packs 121, and each OLT port 123 can be connected to multiple ONUs, including real ONUs and emulated ONUs. The controller packs 122 of the OLT 120 may be connected to the external traffic generator 360 and an element management system (EMS) 372. The EMS 172 manages and monitors the operations of the OLT 120 and the ONUs (real and emulated) that are coupled to the OLT 120.

Each OLT port 123 may be connected to real ONUs and emulated ONUs directly or via a splitter. In the embodiment of FIG. 3A, some of the OLT ports 123 are directly connected to the GPON ports 240 of the ONU emulator 310 via GPON links, and some of the OLT ports 123 are connected to a combination of the real ONUs 112 and the GPON ports 240 of the ONU emulator 310 via one or more passive optical splitters (only one passive optical splitter 170 is shown). As shown in FIG. 3A, the passive optical splitter 170 is connected to one of the OLT ports 123 via a GPON link shared by the real ONUs 112 and the ONU emulator 310. Thus, the performance of the OLT 120 can be tested under a variety of test conditions, including a combination of real network traffic and emulated network traffic. The OLT 120 can be tested under a controlled level of load, and the effect of the emulated network traffic on the OLT 120 and on the real ONUs 112 can be observed and analyzed.

The interconnection between the OLT 120 and the ONUs (real and emulated ONUs) is fully configurable. Each OLT port 123 may be connected, either directly or via a splitter, to any one of the GPON ports 240 in any one of the emulated ONU platforms 200. Similarly, each GPON port 240 in any one of the emulated ONU platforms 200 may be connected, either directly or via a splitter, to any one of the OLT ports 123 in any one of the OLT packs 121. The real ONUs 112 can be also connected to any one of the OLT ports 123 in any one of the OLT packs 121 either directly or via a splitter.

Figure 3B:
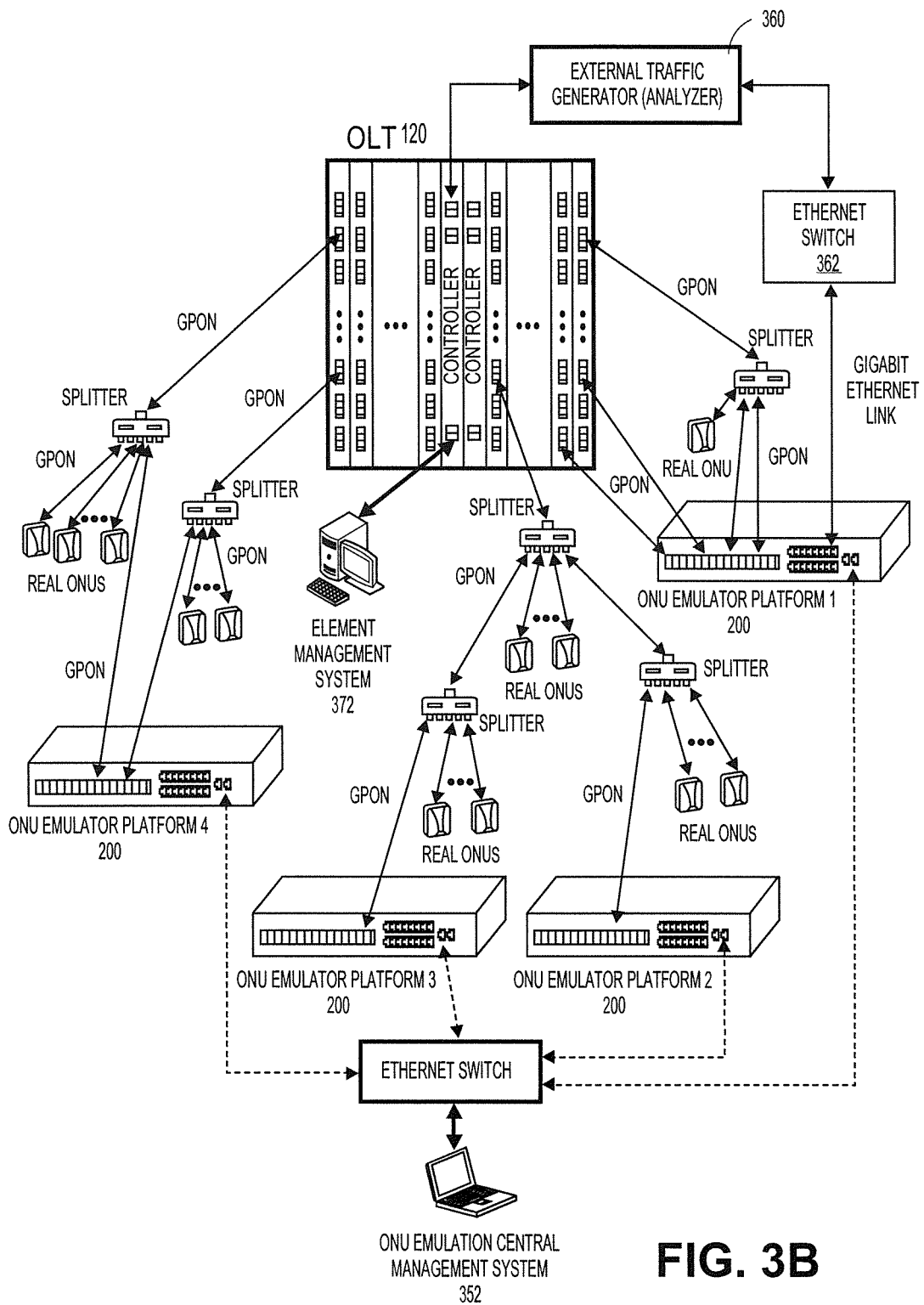
FIG. 3B illustrates further details of a GPON emulation environment according to another embodiment of the invention.

FIG. 3B illustrates another example of a GPON emulation system in which multiple ones of the emulated ONU platforms 200 are deployed according to one embodiment. In this embodiment, each of the emulated ONU platforms 200 has one or more connections to the OLT 120 via a splitter (such as the passive optical splitter 170). Each splitter 170 is also coupled to one or more real ONUs 112. The emulated ONU platforms 200 may be distributed across multiple areas, or may be stacked or otherwise arranged in one location. In this embodiment, the central management system 352, the external traffic generator 360, and Ethernet switch modules 362, 363 perform the same functions as described previously in FIG. 3A.

Figure 4:
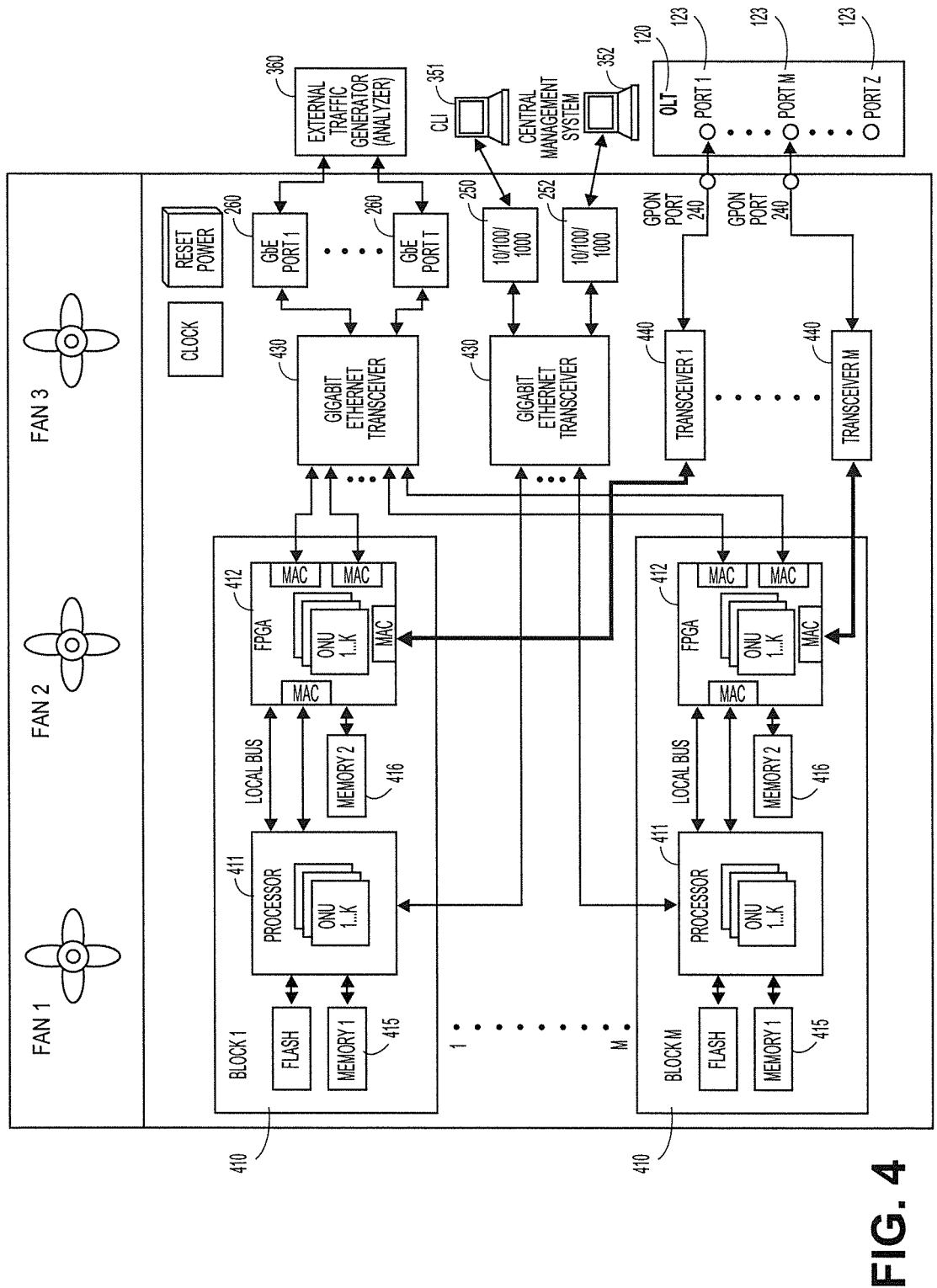
FIG. 4 illustrates an example of the circuitry within an emulated ONU platform according to one embodiment of the invention.

FIG. 4 illustrates the hardware architecture of an emulated ONU platform 200 according to one embodiment. In this embodiment, the emulated ONU platform 200 includes M ONU platform blocks 410, and each ONU platform block 410 emulates a group of K ONUs (where M and K are positive integers). Each ONU platform 200 can emulate the behavior of K×M ONUs simultaneously. In one embodiment, K=64 and M=8. In alternative embodiments K and M may be different numbers. The K ONUs can be configured as different types of ONUs (e.g., SFUs, MDUs, ONU for data services only and/or ONUs for data and voice services). The emulated traffic of the K ONUs can have mixed frame sizes, Virtual Local Area Network (VLAN) tags and QoS per user network interface (UNI). Each ONU platform block 410 is connected to a GPON port 240, which in turn can be connected to an OLT port 123. When the M ONU platform blocks 410 are connected to M OLT ports 123 (as shown in FIG. 4), these M OLT ports 123 can be in the same OLT pack 121 or in different OLT packs 121 (of FIG. 3A).

When multiple emulated ONU platforms 200 perform ONU emulation simultaneously, upstream traffic (i.e., from an ONU to an OLT) can be generated with an aggregate capacity sufficient to oversubscribe the total upstream links. The responses from the OLT 120 can be used to evaluate the OLT's traffic control and management features (e.g., dynamic bandwidth allocation (DBA), bandwidth allocation limits, traffic prioritization, etc.) under overload conditions.

In the embodiment of FIG. 4, each ONU platform block 410 includes a processor 411 coupled to a specialized hardware device, such as a field-programmable gate array (FPGA) 412. Each processor 411 can be coupled to the CLI 351 and the central management system 352 via one of GbE transceivers 430 and control ports 250 and 252 (shown as 10/100/1000 ports 250 and 252). Each processor 411 is also coupled to a number of memory devices 415. Each processor 411 emulates the control and management functions of K ONUs at the same time.

In one embodiment, each processor 411 executes software that provides support for logging various events (Physical Layer Operations, Administration and Management (PLOAM) messages, ONU Management and Control Interface (OMCI) messages, reboot/shutdown events, etc.) for each emulated ONU, and sends the logged messages to a debug port. The logged messages can be analyzed by externally developed tool or utility.

In the embodiment of FIG. 4, each FPGA 412 includes four medium access control (MAC) ports. A first MAC port is connected to the processor 411 of the same group, a second MAC port is connected to a GPON transceiver 440 that can in turn be connected to one of the OLT ports 123, and third and fourth MAC ports are connected to the GbE transceivers 430 that can in turn be connected to the external traffic generator 360. Each FPGA 412 is also coupled to one or more memory devices 416. Each FPGA 412 includes an internal traffic generator (not shown) that emulates the traffic of K ONUs. In one embodiment, the FPGA 412 generates upstream high-speed Internet access (HSIA) traffic for the K ONUs to send to the OLT 120. The FPGA 412 may implement a GPON MAC, a GPON Transmission Convergence (GPON) Frame composer, and HSIA traffic generation for the K ONUs in the same ONU platform block 410. Additional functions may also be implemented by the FPGA 412.

In one embodiment, the processor 411 manages the profiles of the K ONUs in the same ONU platform block 410. The profiles may be stored in Management Information Bases (MIBs), and may be configurable by the CLI 351 and the central management system 352 to control the emulation of the K ONUs. The processor 411 is responsible for emulating system Operations, Administration and Management (OAM) functions, OMCI management, configuration management, and ONU control traffic generation for the K ONUs in the same ONU platform block 410. Examples of the control traffic may include IGMP, DHCP, PPPoE, ARP, and 802.1x /RADIUS traffic.

Figure 5:
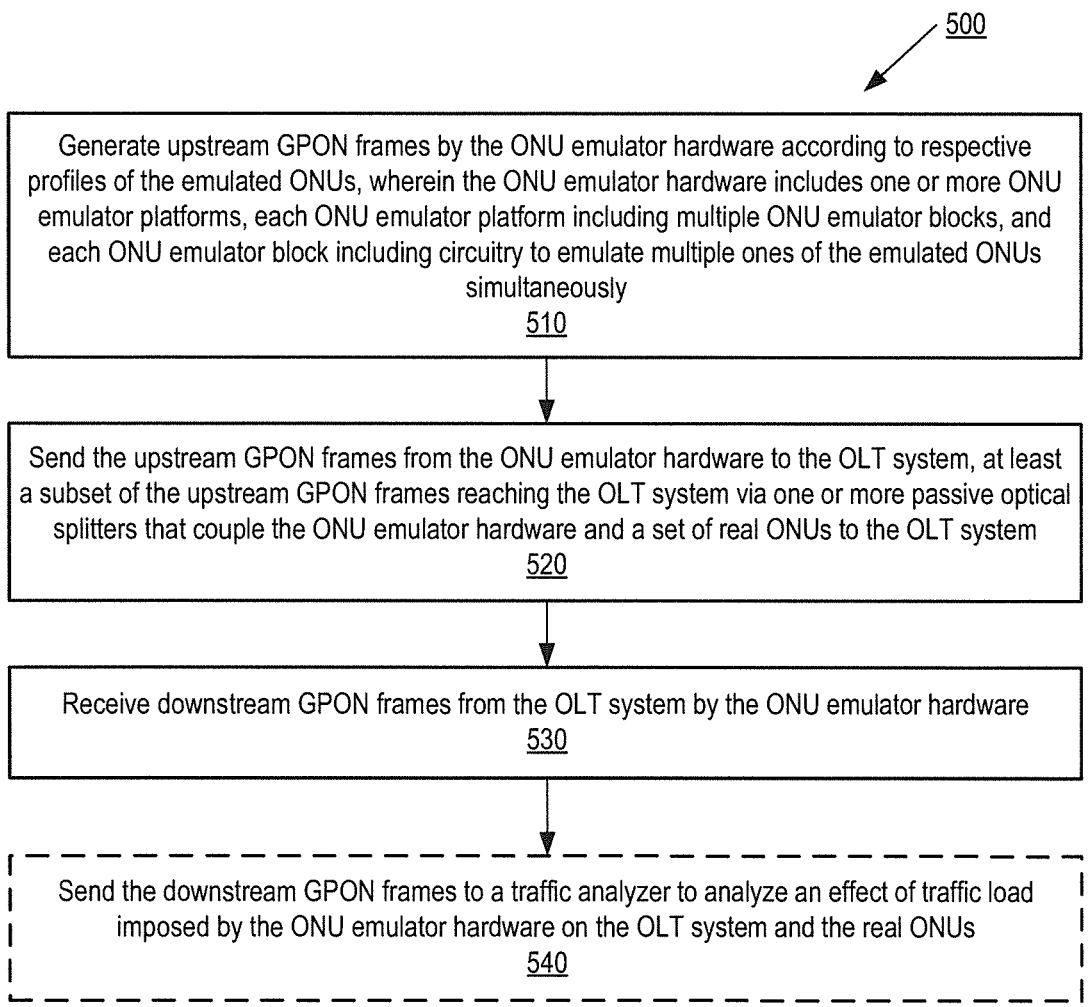
FIG. 5 is a flow diagram illustrating a method of emulating mixed types of ONUs according to one embodiment of the invention.

FIG. 5 is a flow diagram illustrating a method 500 performed by an emulated ONU platform 200 (e.g., the emulated ONU platform 200 of FIG. 2). In one embodiment, the emulated ONU platform includes multiple ONU emulator blocks, and each ONU emulator block includes circuitry to emulate multiple emulated ONUs simultaneously. The emulated ONU platform generates upstream GPON frames according to respective profiles of the emulated ONUs (block 510), and sends the upstream GPON frames to the OLT system (block 520). At least a subset of the upstream GPON frames reach the OLT system via one or more passive optical splitters that couple the emulated ONU platform and a set of real ONUs to the OLT system. The emulated ONU platform also receives downstream GPON frames from the OLT system (block 530). In one embodiment, selected parts of the downstream GPON frames may be sent to a traffic analyzer (e.g., the external traffic generator 360) through a GbE port to analyze an effect of traffic load imposed by the emulated ONU platform on the OLT system and the real ONUs (block 540).

In one embodiment, the upstream GPON frames include, but are not limited to, a mix of HSIA traffic, OMCI traffic, PLOAM traffic, control traffic and dynamic bandwidth report upstream (DBRu) traffic. The upstream traffic are generated according to the respective profiled of the emulated ONUs. The upstream traffic such as HSIA, control and DBRu traffic may be generated as pseudo random data. The upstream OMCI and PLOAM traffic may also follow random patterns. Alternatively, the upstream traffic may follow any traffic generating patterns specified by the profiles. The downstream GPON frames include, but are not limited to, a mix of HSIA traffic, Internet Protocol Television (IPTV) traffic, OMCI traffic, PLOAM traffic, control traffic and DBA related traffic.

In one embodiment, the profiles of an emulated ONU include an ONU emulation profile, which contains information such as: ONU unique information (e.g., serial number, MAC address, PLOAM password, etc.), ONU variant type (e.g., model, number of Ethernet UNI ports, Plain Old Telephone Service (POTS) ports, etc.), ONU status (e.g. enabled/disabled, activated/deactivated, ranged, in-service/out-of-service), software version, and the like. The ONU emulation profile may also specify the emulation triggers for triggering emulation events on the specified emulated ONU.

In one embodiment, the emulated ONU platform receives the profiles, configuration and commands from a CLI or central management system, according to which the emulated ONUs are created to generate data, management and control traffic for transmission to an OLT. The traffic includes mixed types of ONU traffic. Some of the traffic may be delivered to the OLT via GPON links shared with real ONUs. The traffic may include ONU alarms, ONU concurrent downloads, ONU concurrent performance monitor counter collection, concurrent control traffic, concurrent HSIA traffic and the like. The emulated ONU platform also handles the responses and queries from the OLT and the network. In one scenario, the responses from the OLT and the network may be forwarded by the ONUs to an external traffic generator (e.g., the external traffic generator 360 of FIG. 3A), which analyzes the responses. In one embodiment, the external traffic generator may generate traffic and send the traffic to an emulated ONU platform, and the emulated ONU platform passes that traffic upstream to the OLT.

Figure 6:
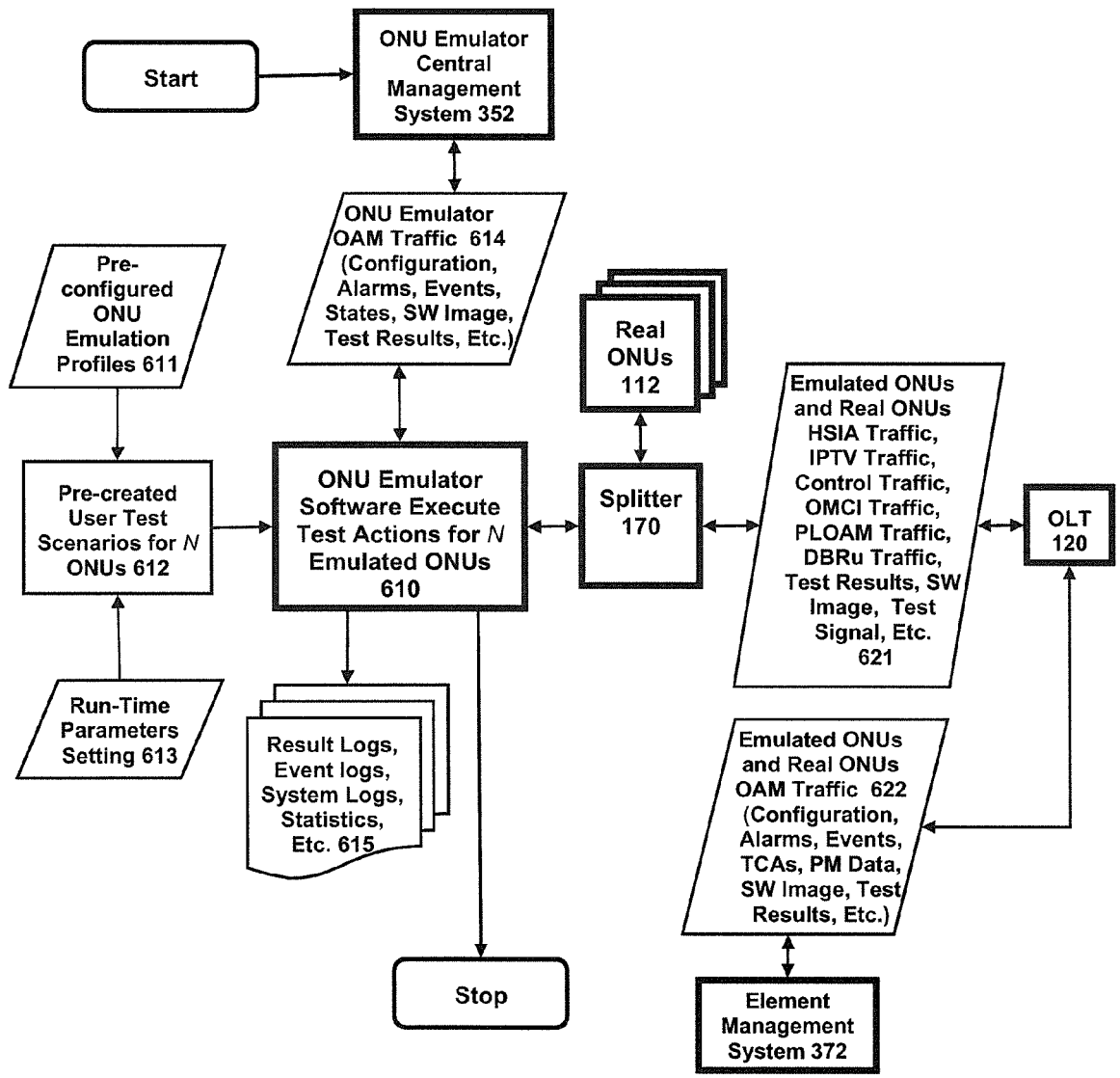
FIG. 6 is a diagram illustrating further details of emulating mixed types of ONUs according to one embodiment of the invention.

FIG. 6 is a diagram illustrating a process for emulating mixed types of emulated ONU traffic according to one embodiment. In one embodiment, an emulated ONU platform (e.g., an emulated ONU platform 200, or more specifically, the processors 411 of FIG. 4) executes software to perform test actions for N emulated ONUs (e.g., up to M×K emulated ONUs) (610). The software may receive pre-created user test scenarios for the N emulated ONUs as input (612). These user test scenarios may be created based on pre-configured ONU emulation profiles (611) and run-time parameter settings (613). The software may communicate with the central management system 352 to manage the test actions. In one embodiment, the communication may be in the form of OAM traffic, including but not limited to configuration, alarms, events, states, software images, test results and the like (614). The test process may be recorded in a number of log files, such as result logs, event logs, statistics logs, system logs, and the like (615).

The test actions may cause the emulated ONU platform to generate upstream traffic to the OLT 120. This emulated upstream traffic and the real ONU traffic from the real ONUs 112 go through the same passive optical splitter 170. The passive optical splitter 170 also receives downstream traffic from the OLT 120 and passes the downstream traffic to the real ONUs 112 and the emulated ONU platform. The link between the OLT 120 and the splitter 170 is shared by the real ONUs 112 and the emulated ONU platform. The link carries upstream and downstream traffic for the real ONUs 112 and the emulated ONU platform, including but not limited to: HSIA traffic, IPTV traffic, control traffic, OMCI traffic, PLOAM traffic, DBRu traffic, test results, software image, test signal, and the like (621). Additional information exchanged on the link may include but is not limited to alarms, events, threshold crossing alerts (TCAs), performance monitoring (PM) data. The element management system (EMS) 372 may monitor the OAM traffic between the OLT 120 and the ONUs (including the emulated and real ONUs), including but not limited to: configuration, alarms, events, TCAs, PM data, software images, test results and the like (622). The data collected from this monitoring may be used to determine the emulated traffic impact on the OLT 120 and the real ONUs 112.

Although only one emulated ONU platform is described in connection with FIG. 6, it is understood that the operation of the diagrams of FIGS. 5 and 6 can be performed by multiple emulated ONU platforms concurrently.

The ONU emulation described herein allows an operator to test the performance, scalability and functioning of an OLT.

The test can be designed to allow the operator to assess the impact of heavy duty operations (e.g., concurrent upgrade of ONUs) and mal-functioning ONUs on the OLT, which in turn may impact the real ONUs sharing the same GPON links with the emulated ONUs. The EMS 372 or an operator of the EMS 372 may monitor the above-mentioned OAM traffic (e.g., 622 of FIG. 6) and assess the impact of various test scenarios on the OLT and the real ONUs.

In one scenario of concurrent ONU upgrade, the ONUs that are being concurrently upgraded include a mix of real ONUs and emulated ONUs. The upgrade may be initiated from the OLT. The real ONUs and emulated ONUs share the same GPON links between passive optical splitters and the OLT. The OLT may be connected to these passive optical splitters via multiple ports that are on the same OLT pack and/or across multiple OLT packs, as shown in the example of FIG. 3B. The OLT does not distinguish emulated ONUs from real ONUs. To the OLT, emulated ONUs and real ONUs behave in the same way. To upgrade these ONUs, the OLT downloads upgraded software images to the real and emulated ONUs via the shared GPON The software image of the ONU (both real and emulated ONUs) is large and may take several minutes to complete the upgrade. The software download traffic that goes into the emulated ONUs may impact the software download traffic that goes in to the real ONUs. During the concurrent upgrade, the operator can assess the progress and the status of the ONU upgrade for real ONUs via the EMS 372 and/or a CLI connected to the OLT.

In another scenario, selected numbers of emulated ONUs and real ONUs are attached to one OLT port through a passive optical splitter. An operator can monitor the performance and functioning of the real ONUs while upgrading the emulated ONUs, thereby assessing the impact of the emulated software download traffic on the real ONUs. The assessment can be made through the EMS 372 and/or a CLI connected to the OLT while the real ONUs are performing activities. In one embodiment, an external traffic analyzer (such as the external traffic generator/analyzer 360) may analyze the HSIA and IPTV downstream traffic to assess the impact of the ONU upgrade on the downstream traffic.

In one embodiment, the emulated ONUs may generate upstream traffic according to traffic generating patterns specified for each of the emulated ONUs. The traffic generating patterns may be specified in the profiles for respective emulated ONUs, or may be specified by commands from the central management system 352 or CLI 351 (of FIG. 3A). One or more of the traffic generating patterns (e.g., patterns specified in an error injection profile) may specify errors to be injected into the upstream traffic. The injected errors from an emulated ONU are processed by the OLT, which may impact the behavior of the OLT and subsequently the real ONUs that share the same GPON link with the error-injecting emulated ONU. Examples of the injected errors include but are not limited to: OMCI failure, PLOAM failure, software download errors, excessive delays responding to OMCI requests, excessive delays responding to PLOAM requests, disabled transceiver connecting emulated ONUs to an OLT port, and the like. The performance and functioning of the OLT and the real ONU may be observed and assessed at the OLT via the EMS 372 and/or a CLI connected to the OLT.

The operations of the diagrams of FIGS. 5 and 6 have been described with reference to the exemplary embodiment of FIGS. 1-4. However, it should be understood that the operations of the diagrams of FIGS. 5 and 6 can be performed by embodiments of the invention other than those discussed with reference to FIGS. 1-4, and the embodiments discussed with reference to FIGS. 1-4 can perform operations different than those discussed with reference to the diagrams of FIGS. 5 and 6. While the diagrams of FIGS. 5 and 6 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware As used herein, a network node (e.g., a router, switch, bridge, controller) is a piece of networking equipment, including hardware and software, that communicatively interconnects other equipment on the network (e.g., other network nodes, end stations). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network nodes, which are coupled (e.g., through one or more core network nodes) to other edge network nodes, which are coupled to other end stations (e.g., server end stations).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by an emulated Optical Network Unit (ONU) platform hardware to execute functions of a plurality of emulated ONUs simultaneously, to thereby enable traffic emulation in a Gigabit-capable Passive Optical Network (GPON) that carries mixed types of emulated ONU traffic and real ONU traffic, the GPON including an Optical Line Termination (OLT) system coupled to the emulated ONU platform hardware, the method comprising the steps of:
generating upstream GPON frames by the emulated ONU platform hardware according to respective profiles of the plurality of emulated ONUs, wherein the emulated ONU platform hardware includes a plurality of ONU emulator blocks, and each of the ONU emulator blocks including circuitry to emulate multiple ones of the emulated ONUs simultaneously;
sending the upstream GPON frames from the emulated ONU platform hardware to the OLT system, at least a subset of the upstream GPON frames reaching the OLT system via one or more passive optical splitters that couple the emulated ONU platform hardware and a set of real ONUs to the OLT system; and
receiving downstream GPON frames form the OLT system by the emulated ONU platform hardware.

2. The method of claim 1, further comprising the step of sending selected parts of the downstream GPON frames to a traffic analyzer through a gigabit Ethernet port to analyze an effect of traffic load imposed by the emulated ONU platform hardware on the OLT system and the real ONUs.

3. The method of claim 1, wherein the step of generating further comprises the step of concurrently generating the upstream GPON frames by the emulated ONUs in all of the ONU emulator blocks to thereby maximize traffic load imposed by the emulated ONU platform hardware on the OLT system.

4. The method of claim 1, further comprising the step of receiving the profiles by the emulated ONU platform hardware from an input, wherein the profiles specify different ONU types and different ONU status for different ones of the emulated ONUs.

5. The method of claim 1, further comprising the steps of generating the upstream GPON frames according to a plurality of traffic generation patterns specified for each of the emulated ONUs, at least one of the traffic generating patterns including errors.

6. The method of claim 1, wherein the upstream GPON frames include a mix of High-Speed Internet Access (HSIA) traffic, ONU Management and Control Interface (OMCI) traffic, Physical Layer Operations, Administration and Management (PLOAM) traffic, control traffic and dynamic bandwidth report upstream (DBRu) traffic.

7. The method of claim 1, wherein the downstream GPON frames includes a mix of HSIA traffic, Internet Protocol Television (IPTV) traffic, OMCI traffic, PLOAM traffic, control traffic and Dynamic Bandwidth Allocation (DBA) related traffic.

8. An emulated Optical Network Unit (ONU) platform that executes functions of a plurality of emulated ONUs simultaneously to thereby enable traffic emulation in a Gigabit-capable Passive Optical Network (GPON) that carries mixed types of emulated ONU traffic and real ONU traffic, the GPON including an Optical Line Termination (OLT) system coupled to the emulated ONU platform, the emulated ONU platform comprising:
a plurality of ONU emulator blocks;
memory within each of the ONU emulator blocks to store profiles of the plurality of emulated ONUs;
traffic generation hardware within each of the ONU emulator blocks to emulate multiple ones of the emulated ONUs simultaneously, the traffic generation hardware being adapted to generate upstream GPON frames according to respective profiles of the multiple emulated ONUs; and
a plurality of GPON ports coupled to the traffic generation hardware, the GPON ports adapted to send the upstream GPON frames to the OLT system and to receive downstream GPON frames from the OLT system, at least a subset of the GPON frames to reach the OLT system via the one or more passive optical splitters that couple the emulated ONU platform and the real ONUs to the OLT system.

9. The emulated ONU platform of claim 8, further comprising a plurality of gigabit Ethernet ports adapted to send selected parts the downstream GPON frames to a traffic analyzer to analyze the effect of traffic load imposed by the emulated ONU platform on the OLT system and the real ONUs.

10. The emulated ONU platform of claim 8, wherein all of the ONU emulator blocks generate the upstream GPON frames concurrently to thereby maximize traffic load imposed by the emulated ONU platform on the OLT system.

11. The emulated ONU platform of claim 8, wherein the profiles specify different ONU types and different ONU status for different ones of the emulated ONUs.

12. The emulated ONU platform of claim 8, wherein the upstream GPON frames are generated according to a plurality of traffic generation patterns specified for each of the emulated ONUs, at least one of the traffic generating patterns including errors.

13. The emulated ONU platform of claim 8, wherein the upstream GPON frames include a mix of High-Speed Internet Access (HSIA) traffic, ONU Management and Control Interface (OMCI) traffic, Physical Layer Operations, Administration and Management (PLOAM) traffic, control traffic and dynamic bandwidth report upstream (DBRu) traffic.

14. The emulated ONU platform of claim 8, wherein the downstream GPON frames includes a mix of HSIA traffic, Internet Protocol Television (IPTV) traffic, OMCI traffic, PLOAM traffic, control traffic and Dynamic Bandwidth Allocation (DBA) related traffic.

15. A system for traffic emulation in a Gigabit-capable Passive Optical Network (GPON) that carries mixed types of emulated ONU traffic and real ONU traffic to thereby assess an effect of traffic load imposed by an Optical Network Unit (ONU) emulator on an Optical Line Termination (OLT) system and real ONUs, the OLT system including a plurality of OLT packs, each of the OLT packs including a plurality of OLT ports, the system comprising:
one or more passive optical splitters that couple the ONU emulator and the real ONUs to the OLT system; and
the ONU emulator coupled to the OLT ports via GPON links and the one or more passive optical splitters to execute functions of a plurality of emulated ONUs simultaneously, the ONU emulator further comprising:
memory to store profiles of the plurality of emulated ONUs;

one or more ONU emulator platforms, each of the ONU emulator platforms including a plurality of ONU emulator blocks;

traffic generation hardware within each of the ONU emulator blocks to emulate multiple ones of the emulated ONUs simultaneously, the traffic generation hardware adapted to generate upstream GPON frames according to respective profiles of the multiple emulated ONUs; and a plurality of GPON ports within each of the ONU emulator platforms, the GPON ports adapted to send the upstream GPON frames to the OLT system and to receive downstream GPON frames from the OLT system, at least a subset of the upstream GPON frames to reach the OLT system via the one or more passive optical splitters.

16. The system of claim 15, further comprising a plurality of gigabit Ethernet ports adapted to send the downstream GPON frames to a traffic analyzer to analyze the effect of the traffic load imposed by the ONU emulator on the OLT system and the real ONUs.

17. The system of claim 15, wherein all of the ONU emulator blocks and all of the ONU emulator platforms generate the upstream GPON frames to thereby maximize traffic load imposed by the ONU emulator on the OLT system.

18. The system of claim 15, further comprising one or more of a command line interface (CLI) and a central management system coupled to the ONU emulator to configure the profiles and to trigger concurrent events of the emulated ONUs.

19. The system of claim 15, wherein the one or more passive optical splitters are adapted to receive the real ONU traffic from the real ONUs, and to receive the GPON frames from the emulated ONUs.

20. The system of claim 15, wherein the emulated ONUs are of different ONU types including Single Family Units (SFUs) and Multiple-Dwelling Units (MDUs), and wherein the emulated ONUs have different types of ports, different numbers of ports, and different supported capabilities and features.

21. The system of claim 15, wherein the real ONUs are of different ONU types including Single Family Units (SFUs) and Multiple-Dwelling Units (MDUs), and wherein the real ONUs have different types of ports, different numbers of ports, and different supported capabilities and features.

22. The system of claim 15, wherein the upstream GPON frames include a mix of High-Speed Internet Access (HSIA) traffic, ONU Management and Control Interface (OMCI) traffic, Physical Layer Operations, Administration and Management (PLOAM) traffic, control traffic and dynamic bandwidth report upstream (DBRu) traffic.

23. The system of claim 15, wherein the downstream GPON frames includes a mix of HSIA traffic, Internet Protocol Television (IPTV) traffic, OMCI traffic, PLOAM traffic, control traffic and Dynamic Bandwidth Allocation (DBA) related traffic.

24. The system of claim 15, wherein the OLT system is adapted to initiate concurrent ONU upgrade and download software images to selected numbers of emulated ONUs and real ONUs simultaneously via a selected number of OLT ports, and wherein a management system coupled to the OLT system is adapted to assess an impact of the ONU upgrade on the OLT system and the real ONUs that share same GPON links with the emulated ONUs being upgraded and receiving the download.

25. The system of claim 15, wherein the OLT system is adapted to initiate concurrent ONU upgrade and download software images to a selected number of emulated ONUs simultaneously via a selected OLT port, and wherein a management system coupled to the OLT system is adapted to assess an impact of the ONU upgrade on the OLT system and the real ONUs that share a same GPON link with the emulated ONUs being upgraded and receiving the download.

26. The system of claim 15, wherein the ONU emulator is adapted to send upstream traffic including injected errors according to an error injection profile to thereby emulate mal-functioning ONUs, and wherein a management system coupled to the OLT system is adapted to assess an impact of the injected errors on the OLT system and the real ONUs that share a same GPON link with the mal-functioning ONUs.

* * * * *